US006793262B2

(12) United States Patent
Sloan et al.

(10) Patent No.: US 6,793,262 B2
(45) Date of Patent: Sep. 21, 2004

(54) EXTERIOR VEHICLE ASHTRAY SYSTEM

(76) Inventors: Mark C. Sloan, 1108 N. D St., Lake Worth, FL (US) 33460; Tristram W. Himmele, 614 1st Ave. S., Lake Worth, FL (US) 33460

( * ) Notice: Subject to any disclaimer, the term of this patent is extended or adjusted under 35 U.S.C. 154(b) by 0 days.

(21) Appl. No.: 10/747,999

(22) Filed: Dec. 29, 2003

(65) Prior Publication Data

US 2004/0140684 A1 Jul. 22, 2004

Related U.S. Application Data

(62) Division of application No. 10/189,967, filed on Jul. 2, 2002, now Pat. No. 6,682,117.
(60) Provisional application No. 60/348,914, filed on Jan. 13, 2002.

(51) Int. Cl.[7] .................................................. B60N 3/12
(52) U.S. Cl. ..................... 296/37.9; 296/1.11; 131/231; 131/242
(58) Field of Search ............................... 296/37.1, 37.9, 296/152, 1.11; 224/278; 131/231, 242

(56) References Cited

U.S. PATENT DOCUMENTS

| 1,746,634 A | | 2/1930 | Breneman | |
| 2,303,980 A | * | 12/1942 | Bonbright | 180/89.11 |
| 2,364,078 A | | 12/1944 | Kisselle et al. | |
| 2,803,390 A | | 8/1957 | Mackay | |
| 3,351,069 A | * | 11/1967 | Carper | 131/235.1 |
| 4,061,149 A | | 12/1977 | Raczkowski | |
| 4,092,008 A | | 5/1978 | Fetter | |
| 4,858,796 A | | 8/1989 | Roth | |
| 4,936,321 A | * | 6/1990 | Bludis | 131/231 |
| 4,941,602 A | | 7/1990 | Wells | |
| 5,284,377 A | | 2/1994 | Krenciprock | |
| 5,645,203 A | | 7/1997 | Tappenden | |
| 5,826,589 A | | 10/1998 | Ohanian | |
| 5,850,957 A | | 12/1998 | Morris | |
| 5,887,596 A | * | 3/1999 | Ziegler et al. | 131/231 |
| 6,095,477 A | | 8/2000 | Pohlman | |
| 6,213,533 B1 | * | 4/2001 | Widulle et al. | 296/37.12 |
| 6,634,690 B2 | * | 10/2003 | Schaal | 296/37.1 |

* cited by examiner

Primary Examiner—D. Glenn Dayoan
Assistant Examiner—Greg Blankenship
(74) Attorney, Agent, or Firm—Clifford Kraft

(57) ABSTRACT

An ashtray that mounts on the exterior of a vehicle that avoids the undesirable conditions of internal ashtrays. The ashtray can mount on a vehicle window, in a vent, or under a vehicle exterior mirror. The ashtray can also be built-in to the vehicle at the time of manufacture. The window version of the ashtray can contain hook/loop material (VELCRO) to attach it to the vehicle window and magnets so that the ashtray can automatically attach to the vehicle metal when the window is lowered. The mirror mounted version can contain a polished face to act as part of the mirror.

4 Claims, 8 Drawing Sheets

EXTERIOR VEHICLE ASHTRAY SYSTEM

This is a divisional application from application Ser. No. 10/189,967 filed Jul. 2, 2002, now U.S. Pat. No. 6,682,117 and claims priority from that application. This application also claims priority from U.S. Provisional application No. 60/348,914, filed Jan. 13, 2002 and hereby incorporates that application by reference.

BACKGROUND

1. Field of the Invention

This invention relates generally to an ashtray for a vehicle and in particular to an ashtray adapted for mounting externally to a vehicle such as an automobile, bus or truck.

2. Description of the Problem Solved

It is well known that cigarette and cigar smoke contains hundreds of toxic and carcinogenic compounds which are not only hazardous for smokers, but dangerous for non-smokers as well. Smoke fumes are most offensive in closed compartments such as automobiles, trucks, busses and the like. Fumes from a cigar or cigarette can linger long after it has been extinguished.

As the hazards of smoking become more widely known among smokers and non-smokers, increasing numbers of people are seeking refuge from "second hand" smoke and the dirt associated with cigarette ash and filter remains. Still, virtually every vehicle built includes an ashtray. Even smokers tend to retreat from the smoking residue by discharging cigarette ash outside the vehicle and simply tossing the expended cigarette out the window, whether extinguished or not.

In addition, the many people who own vehicles, such as automobiles, trucks, busses and the like, in which tobacco products are used, must cope with ash residue and clean-up of cigarette butts. Such vehicle owners can appreciate an ashtray that is practical, convenient, and less offensive to nonsmokers.

Several ash-receiving devices, smoke exhausters and cigarette extinguishers for vehicles have been proposed and implemented. Much of the prior art provides such devices for mounting within a vehicle. Many such devices caution about exposure to wind to avoid blowing ash, or caution about potential fire hazards, but none removes the cigarette and ash from within the closed vehicle.

For example, U.S. Pat. No. 4,061,149 to Raczkowski discloses an ashtray with smoke exhauster. This device requires extensive tubing, pipes and similar material to remove the smoke but still leaves the ash and cigarette residue in the ashtray. Moreover, the device only works when the vehicle is moving in a forward direction.

U.S. Pat. No. 4,092,008 to Fetter discloses a safety ashtray, but it is designed to be securely mounted on the vehicle dashboard, keeping the smoke, ash and residue inside the vehicle.

U.S. Pat. No. 4,936,321 to Bludis discloses an ash receiver with an ash-discharging device. This device is mounted on a vehicle window permitting ash and smoke to be discharged to the environment while maintaining the remaining cigarette residue in the vehicle.

It is apparent that there is a need for an ashtray for use with a vehicle that holds cigarette and cigar residue, such as ash and spent cigar or cigarette butts outside the vehicle. The ashtray should enable less cleaning of the vehicle interior and be less offensive to nonsmokers, while at the same time being efficient, ecologically sound, inexpensive, convenient and safe.

SUMMARY OF THE INVENTION

The present invention provides an ashtray for mounting external to a vehicle (or at least partially external) or along a vent or on a mirror. The ashtray can be portable and used on either the driver's side or the passenger's side of the vehicle. This ashtray can be attractive and convenient for receiving smoking residue that may discharge smoke and other tobacco products. In addition, it can be less offensive to nonsmokers and require less cleaning than a conventional ashtray. Because the present invention does not have to be built into the vehicle, it can generally be used with any existing vehicle without modification of the ashtray or the vehicle (built-in versions are within the scope of the present invention). The present invention can remove ash and residue from the vehicle while retaining all particles, filters and butts in a receptacle outside the passenger compartment of the vehicle. This can prevent residue from accidently being discharged into the passenger compartment or from being discharged in a way that would pollute the environment. In addition, the danger of fire inside or outside the vehicle caused by hot residue or a still smoldering butt is greatly reduced.

The present invention relates to a novel ashtray for normally mounting on the exterior of a vehicle either by an assembly holding the device to a door with a novel attachment made from hook/loop material (sold under the Trademark VELCRO), or by a semi-rigid hook or with suction cups, magnets or other attachment means. In one embodiment, a bag receptacle may be included inside the ashtray to hold discarded cigarette butts for disposal. In a further embodiment, a windscreen can be attached to the ashtray to prevent blowing ashes. In a further embodiment, the novel ashtray can mount to the inside of a vent or visor/shade or be attached to or part of a mirror.

DESCRIPTION OF THE DRAWINGS

To better understand the present invention, certain illustrations and drawings are presented.

Figure 1:
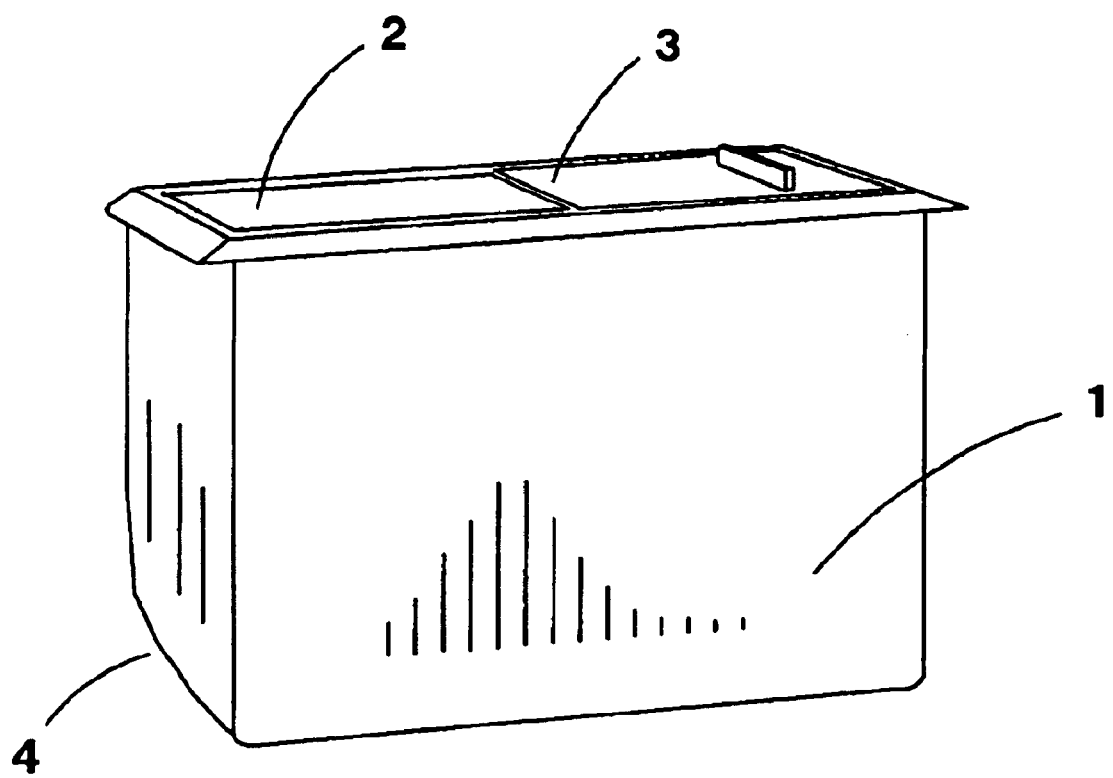
FIG. 1 shows a perspective front view of an embodiment of the invention mounted on a car window.

It will be understood that the above mentioned drawings are for illustration of the concepts of the invention. The present invention is not restricted to embodiments presented in the drawings.

DETAILED DESCRIPTION

FIG. 1 shows a perspective view of an embodiment of the present invention. A cavity 1 holds waste tobacco products such as cigarette butts and ashes. The top of the cavity 1 contains an opening 2 which can be open during normal use. A sliding cover 3 can close the opening when the invention is not in use. This can slide or snap closed. Any type of cover can be used including one that pivots.

The bottom of the cavity 1 can be curved 4 to cause the cavity 1 to be pushed away from the window and attach to the metal vehicle door when the window is lowered. The cavity can be made from any durable material such as metal or plastic. If metal is used, non-ferrous metal is preferred because of the use of magnets that will be described. It should be noted that the cavity 1 can optionally contain an inner bag (not shown) to contain ash and waste and to make removal easier. This optional bag could either be disposable or reusable.

It should also be noted that in an alternative embodiment of the invention, the bottom of the cavity 1 can contain apertures to prevent negative air pressure from building up in the cavity.

Figure 2:
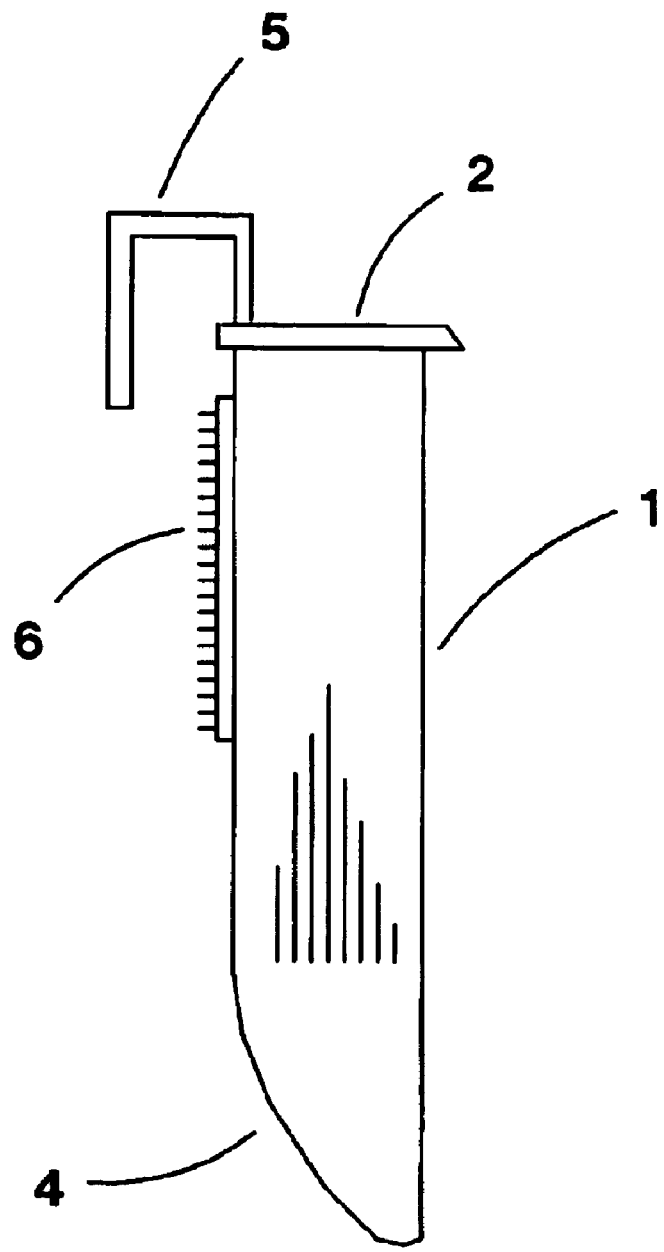
FIG. 2 shows a side view of the embodiment of FIG. 1

FIG. 2 shows a side view of an embodiment of the invention. On the back side of the cavity 1 can be a strip 6 of hook/loop material commonly sold under the trade name of VELCRO (VELCRO is a registered trademark). Optionally, a semi-rigid hook 5 can be used to extend over the top of a vehicle window to hold the astray to the window. In most cases, either the semi-rigid hook or the hook/loop material would be used, but not both. However, an embodiment of the invention could have both attachment means present. Another attachment means can be a suction cup or other suction device. The semi-rigid hook can optionally be made from more than one smaller hook.

The optional curved bottom 4 of the cavity can be seen. The general shape of the cavity can be substantially rectangular, cylindrical, or any other shape that can hold tobacco waste.

Figure 3:
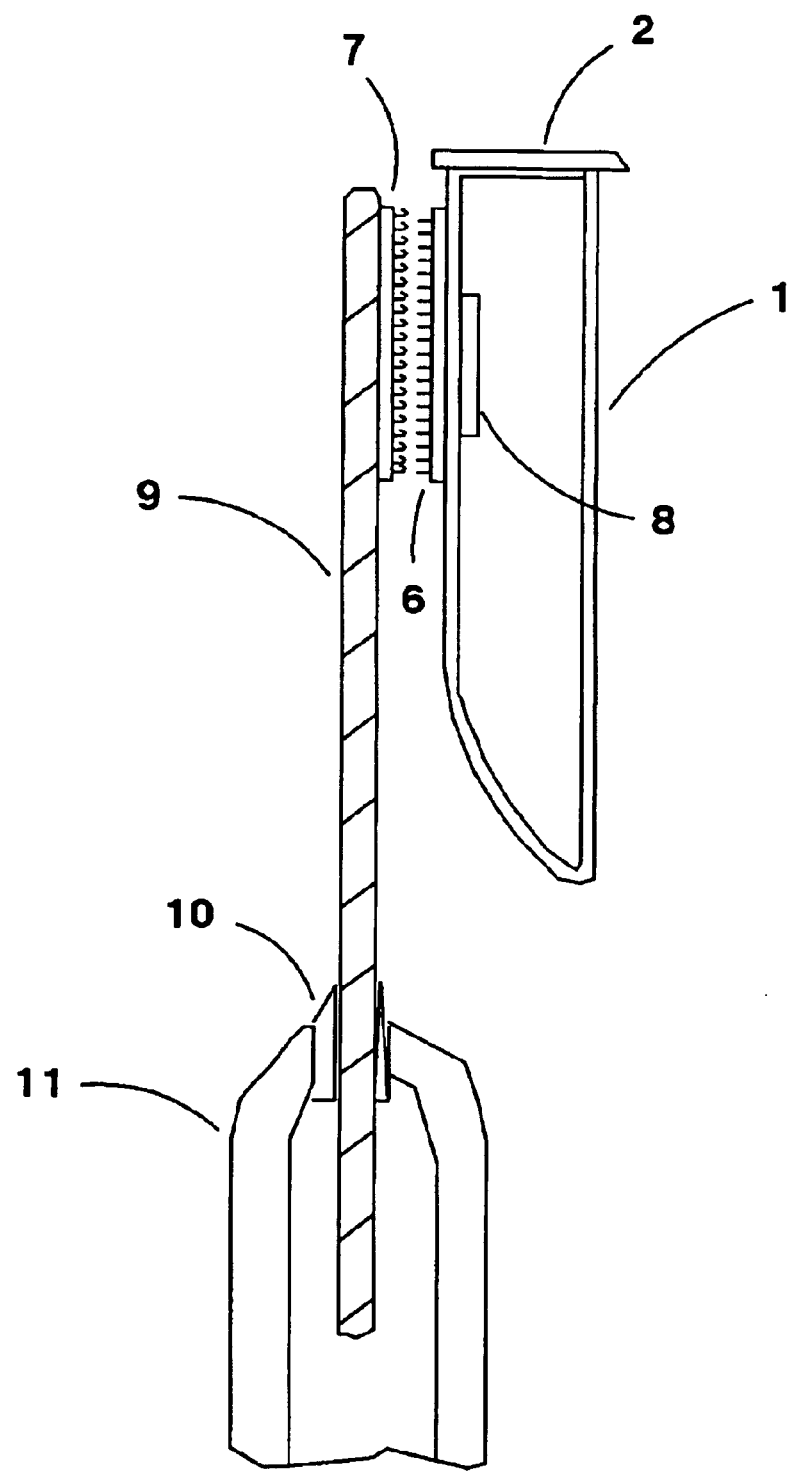
FIG. 3 shows a section view of an embodiment of the invention adapted to adhere when the vehicle window is opened using loop/hook material.

FIG. 3 is a section view showing the cavity 1 attached to a vehicle window 9 using patches of hook/loop material 6, 7. One half of a patch of hook/loop material or VELCRO can be placed on the window 7 and the other half can be placed on the ashtray cavity 6. In addition, magnets 8 can be located in the cavity in proximity to the window 9. As the window 9 is lowered, the curved bottom 4 of the ashtray pushes it away from the window 9 and causes the VELCRO to disconnect. This happens because the curved bottom 4 is pushed outward by the shape of the vehicle door 11. The rubber door waterproofing 10 is also shown in FIG. 3. At the time the VELCRO separates, the magnetic field from the magnet 8 causes an attractive force with the metal of the vehicle door 11 causing the cavity 1 to now attach to the door 11.

When the window 9 is rolled back up, the VELCRO re-attaches and pulls the magnet 8 away from the metal door 11 causing the cavity 1 to again attach to the glass window. For this reason, it is important that the magnet 8 not be too large so that the VELCRO can pull the cavity away.

Figure 4:
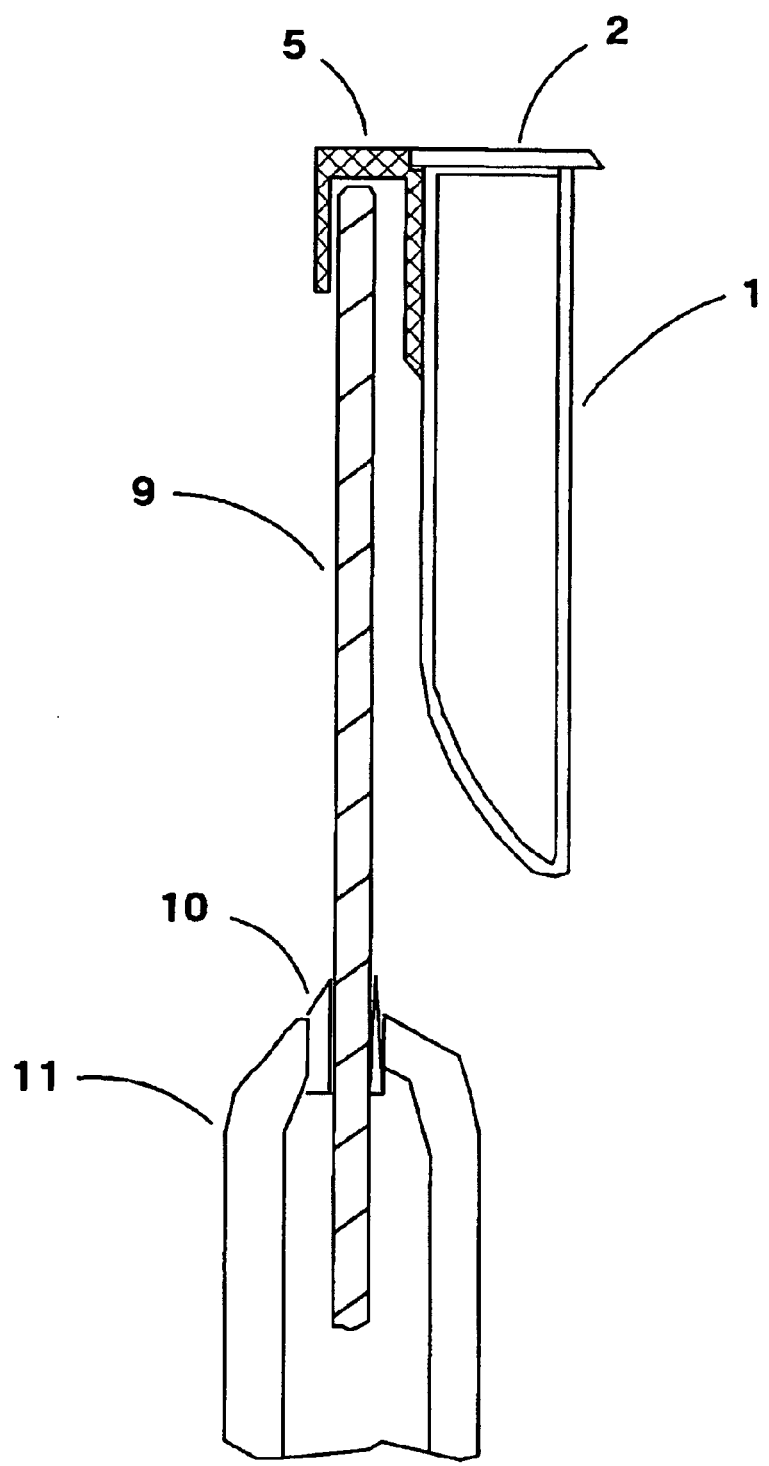
FIG. 4 shows a section view of a different embodiment that uses a hook to attach to the vehicle window.

FIG. 4 shows an alternate way of attaching the cavity 1 to a vehicle window 9 with a semi-rigid hook 5. This hook can be metal or plastic. With this embodiment of the invention, the window normally is not opened all the way. The hook 5 can be made thin enough to allow the window to totally close. The hook 5 can be of a fixed shape as shown in FIG. 4, or it can be in the form of a spring that provides tension against the window.

Another alternate embodiment of the present invention can be a variation where the cavity is mounted to a sun screen or window sun-visor. It will be appreciated that the shape of the ashtray does not have to be rectangular, but can assume any convenient shape. In addition, an embodiment of the invention can mount on a mirror or be part of a mirror. While the invention generally is not built into the vehicle for ease in installation and other advantages, it is within the scope of the present invention to build the ashtray into the vehicle in a mirror, vent, on a visor or any other convenient place.

Figure 5:
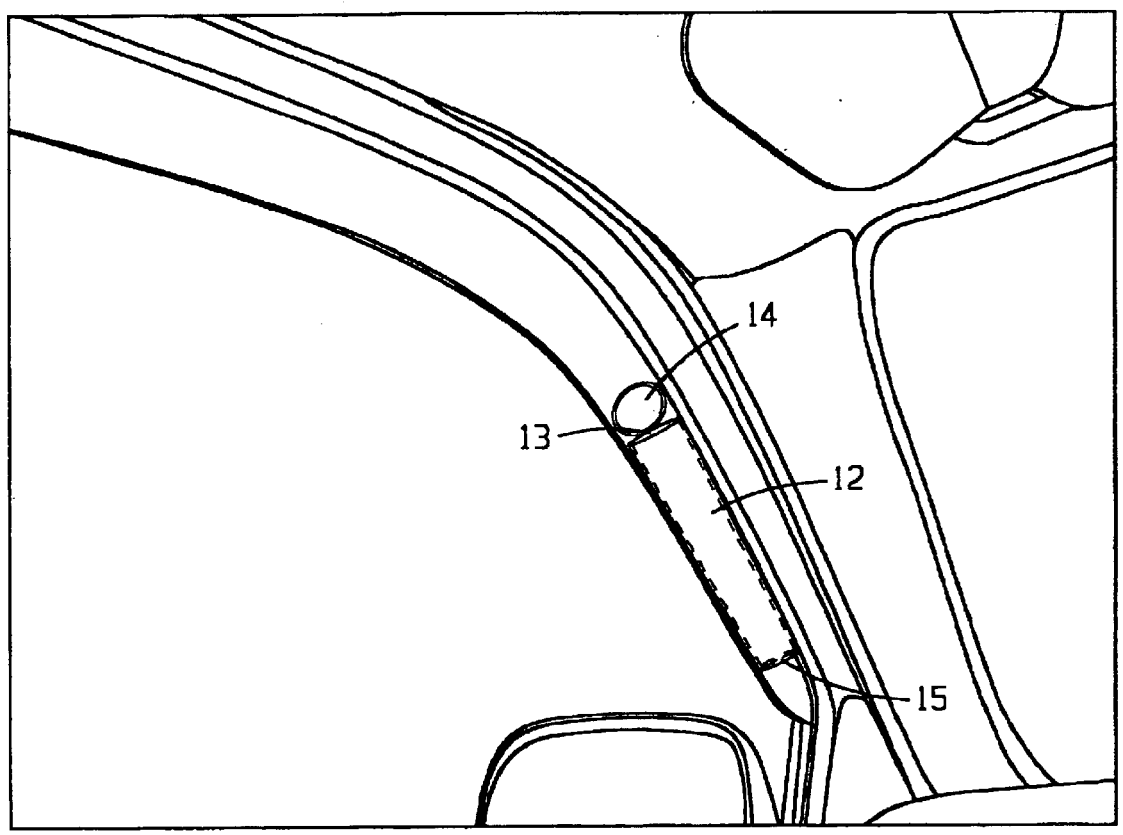
FIG. 5 shows a visor or vent embodiment of the present invention.

FIG. 5 shows an embodiment of the present invention designed to be mounted along a visor in vent. While the illustration in FIG. 5 shows a curved construction, this is not necessary. In general the body 12 of the ashtray can be contoured to fit the desired mounting location. The embodiment of FIG. 5 can be generally cylindrical like a hollow tube with a top opening 13 and a lid 14. It should be noted that the lid 14 is optional and that it can be attached with a spring mechanism to spring closed or open or both (bistatic). An optional port on the bottom 15 can be used to empty the ashtray.

Figure 6:
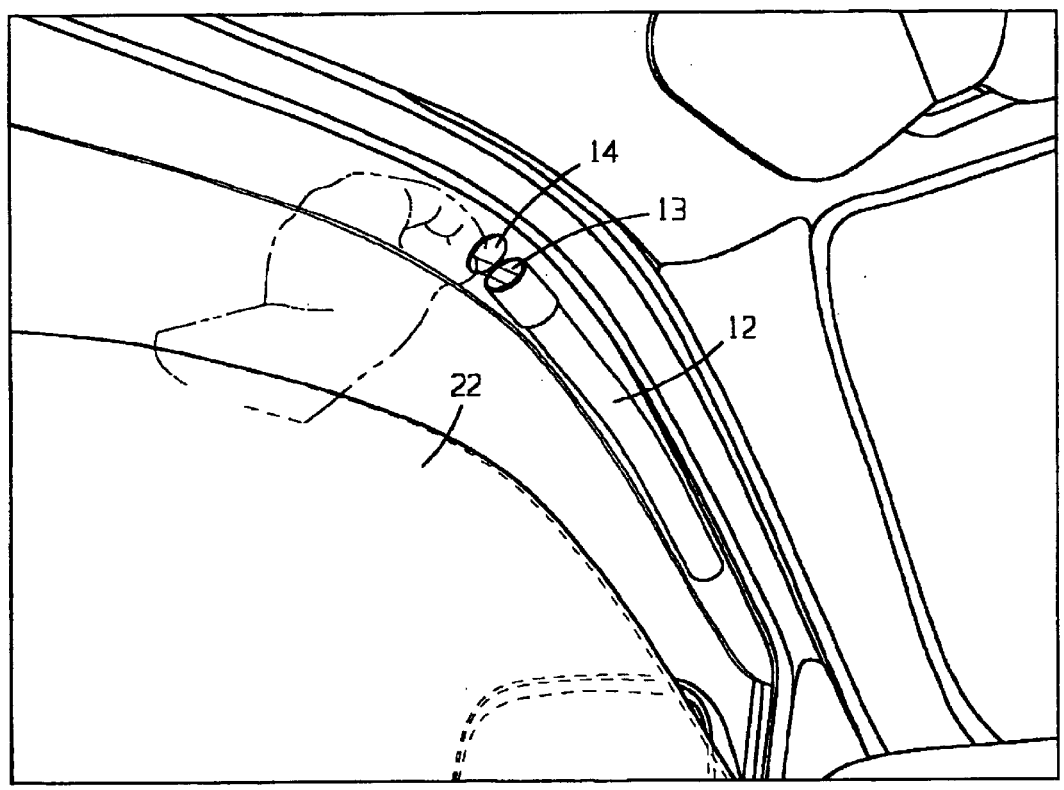
FIG. 6 shows a different visor or vent embodiment.

FIG. 6 shows a slightly different embodiment of a vent version mounted inside the window 22 of a car along the top of the door. The ashtray can be mounted along the channel or vent or along a visor. Again the body 12 and the opening 13 for use can be seen. It should be understood that the shapes and out-lines shown in FIGS. 5 and 6 are simply to aid in understanding the invention. Any cross section, curvature, or shape that can mount in the desired location can be used and is within the scope of the present invention. In particular, the cylindrical cross section can be elliptical or other and does not need to maintain the same diameter along its length.

Figure 7A:
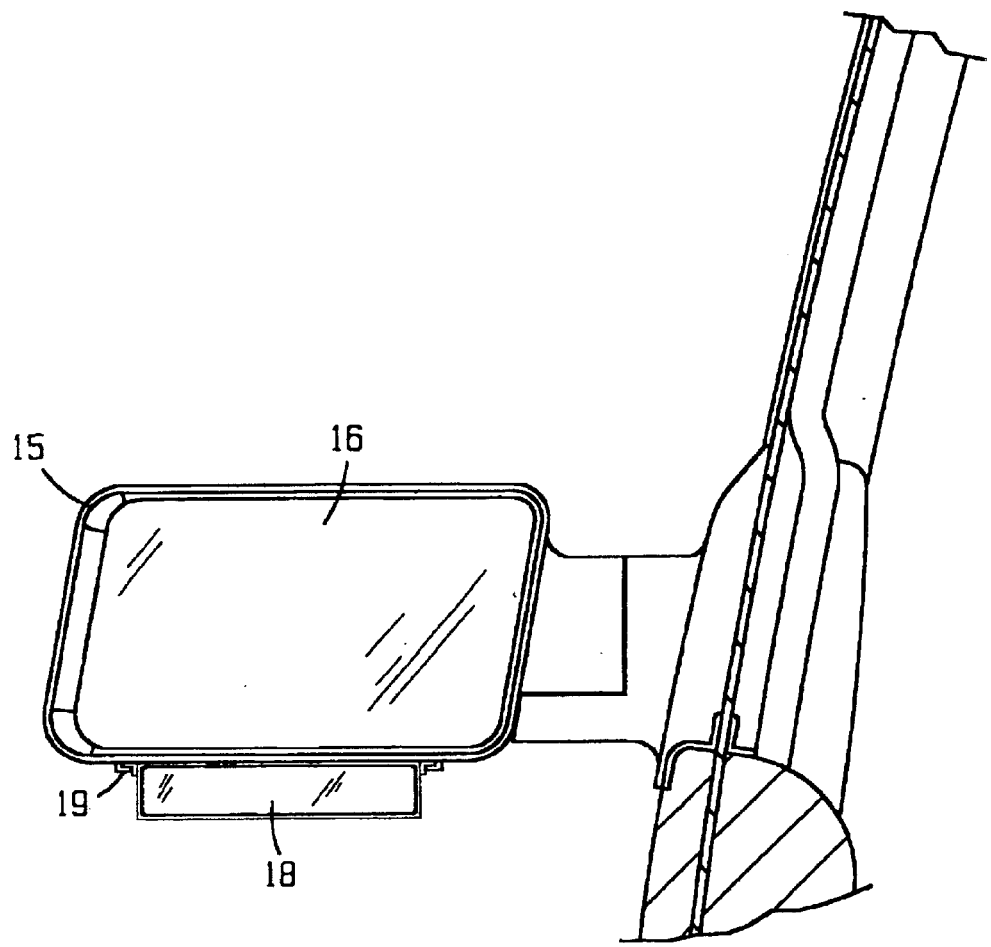
FIG. 7 shows a mirror mounted embodiment of the present invention.
Figure 7B:
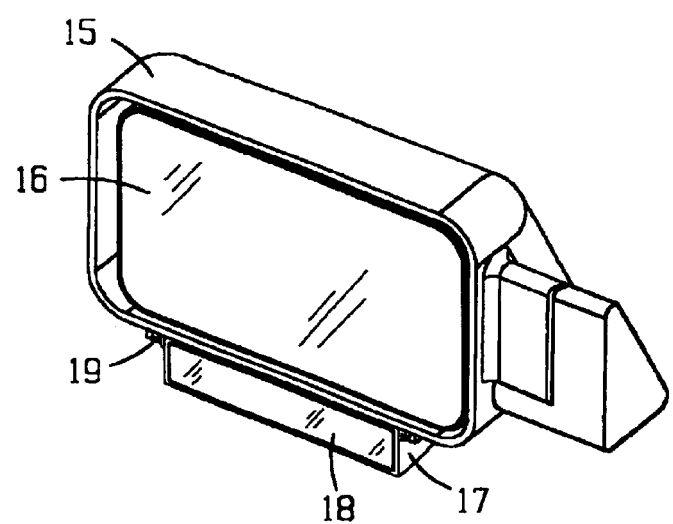

FIG. 7 shows the mirror of a car with a mirror version of the present invention mounted under the exterior door mirror 15. The actual mirror face 16 can be seen with the ashtray 17 mounted below the mirror 15. Optional clips 19 can allow the ashtray to slide under the mirror. The ashtray 17 can be built-in or supplied as an after-market product. The face of the ashtray 18 can be optionally polished and can be curved or flat.

Figure 8A:
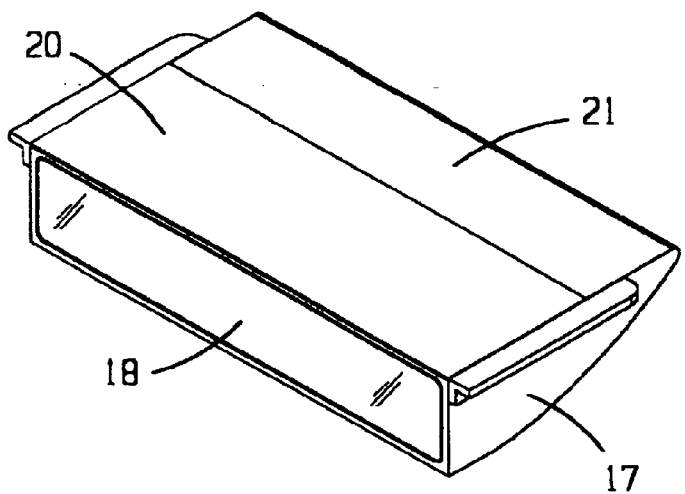
FIG. 8 shows details of a mirror mounted embodiment.
Figure 8B:
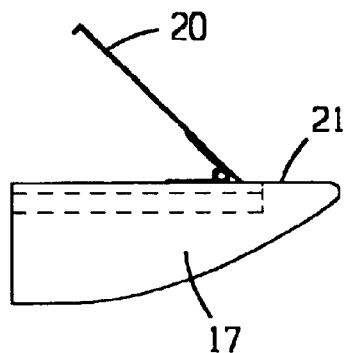
Figure 8C:
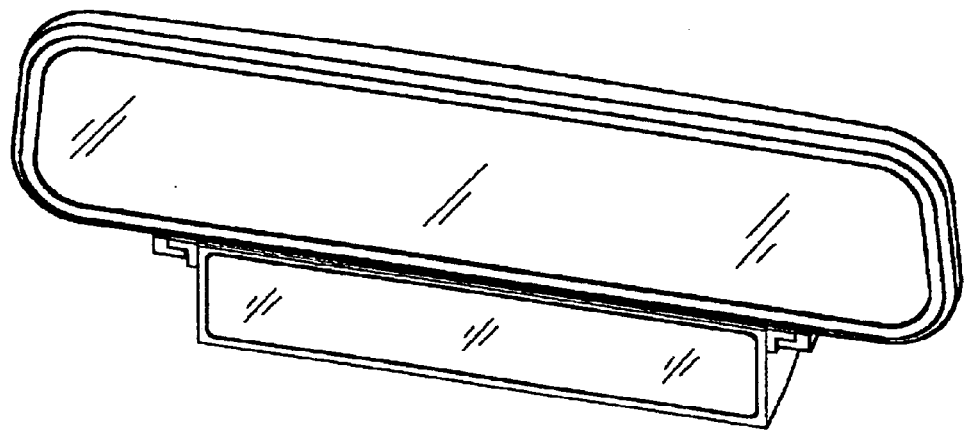

FIGS. 8A–8C show the mirror version of the invention. A lid 20 forms part of the top 21 of the ashtray 17. An optional spring can cause the lid 20 to pop open when the ashtray is pulled forward. The mirror embodiments of the present invention can be used with any mirror including side door exterior mirrors and optionally with an interior rear-view mirror. The exterior version is preferred to keep smoke and residue out of the vehicle.

It should be noted that the embodiments of the ashtray can be made from metal, plastic or other durable material. By plastic, we mean any semi-rigid, durable material. It should also be described can be built all of the embodiments of the present invention described can be built with aerodynamic shapes to prevent excessive air-stream drag.

The invention has been described by various illustrations and written descriptions. It will be appreciated by one skilled in the art that many changes and variations are possible and are within the scope of the present invention. The embodiments presented are therefore merely descriptive of the invention and the inventive concept. The invention is not restricted to the embodiments presented. The scope of the invention will be determined entirely by the claims that follow.

We claim:

1. An ashtray mirror combination for an exterior mirror of a vehicle said ashtray mirror comprising:

an aerodynamic cavity with a substantially rectangular front surface and a curved bottom surface tapering from front to rear, said cavity also having a substantially flat top surface;

a side rear-view vehicle mirror;

attachment means for attaching said aerodynamic cavity under said vehicle mirror;

a lid disposed on said flat top surface of said cavity;

said cavity sliding forward from a non-use position to a use-position, said cavity in said use-position protruding from under said mirror;

said lid having a spring means whereby said lid opens when said cavity is slid from said non-use position to said use-position.

2. The ashtray mirror combination of claim 1 wherein said rectangular front surface is polished.

3. The ashtray mirror combination of claim 1 wherein said lid closes when said cavity is slid from said use-position to said non-use position.

4. The ashtray mirror combination of claim 1 wherein cavity is removable for cleaning.

* * * * *